July 14, 1959     L. D. HANSEN ET AL     2,895,104
TEST SET
Filed Jan. 25, 1955
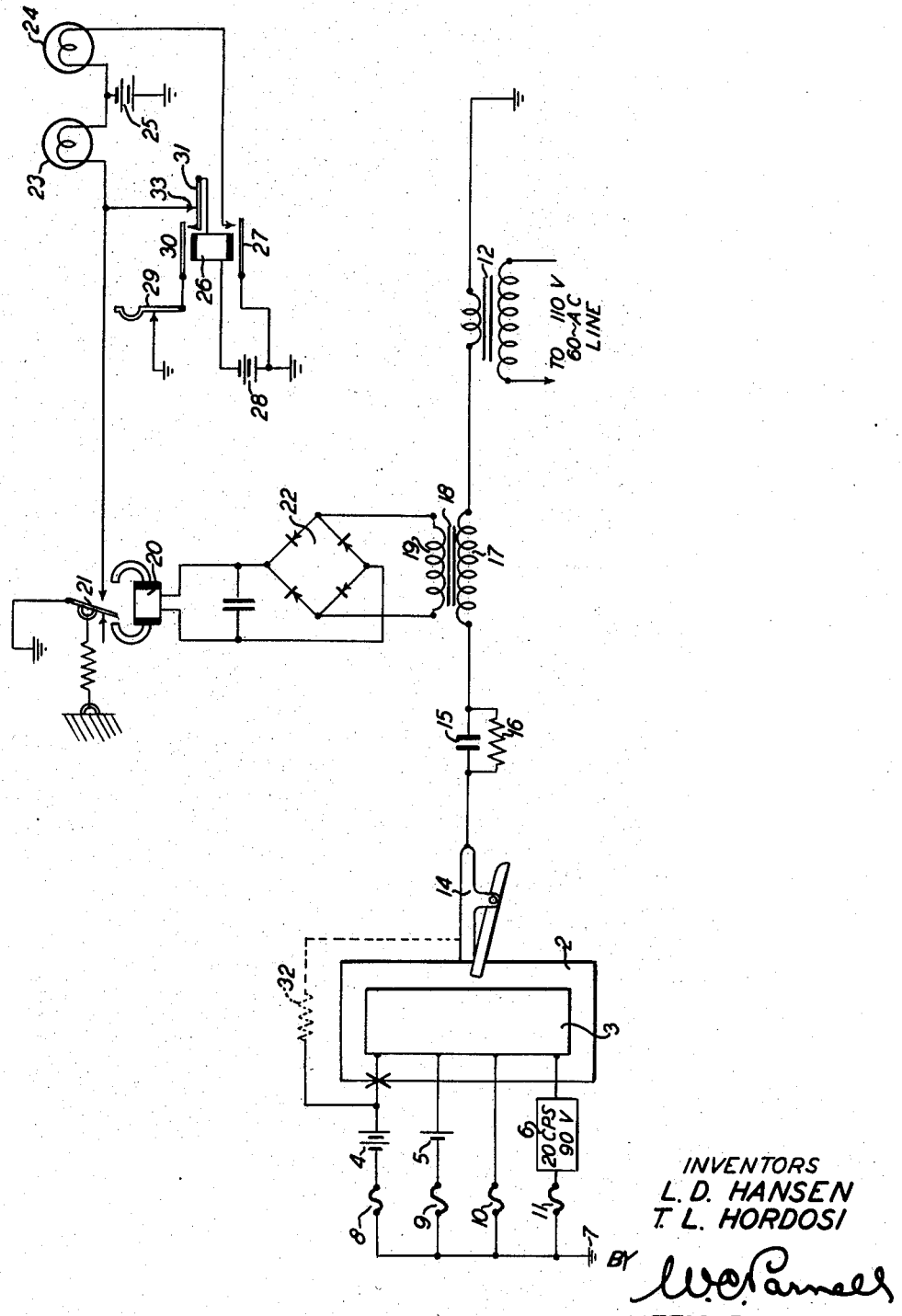
INVENTORS
*L. D. HANSEN*
*T. L. HORDOSI*
BY
ATTORNEY United States Patent Office 2,895,104
Patented July 14, 1959

2,895,104

TEST SET

Lloyd D. Hansen, Scotch Plains, N.J., and Theodore L. Hordosi, Long Island City, N.Y., assignors to Western Electric Company, Incorporated, New York, N.Y., a corporation of New York Application January 25, 1955, Serial No. 484,048

5 Claims. (Cl. 324—51)

This invention relates to testing and particularly to the detection of foreign potentials on a normally isolated body.

It is a common practice, in mounting and wiring electrical apparatus, to connect all terminals which are to be grounded to the metal mounting panels, chassis or framework at one nearest available point and then to connect a single ground lead from the framework to ground thereby effecting material savings in wiring. When this is done however, the ground lead impedance and more or less of the chassis or framework impedance are common to the various circuits. This coupling between the circuits may produce objectionable cross-talk and noise in the circuits particularly when relatively large relay operating currents are involved.

To eliminate this source of cross-talk and noise, the circuits of certain communications equipment, such as telephone switching frames, are provided with individual ground return wires which are connected through fuses to a suitable station ground. When such frames are installed the framework itself is grounded but there should be no direct conductive connection between it and any of the circuits. Since some of these circuits are normally open and may be closed only momentarily during the normal operation of the apparatus, it is necessary to test for foreign potentials on the frame while the apparatus is subject to normal operating potentials. The test equipment used, therefore, must be capable of responding to even momentary faults and must be capable of distinguishing between leads which are properly grounded, for example, through the fuse panel and foreign potentials on the frame due to undesired conductive paths between the wiring and the frame.

The object of this invention is test apparatus for detecting these foreign potentials.

According to the invention, the frame of the apparatus, to which various sources of operating potential are connected, is grounded through a path including a source of alternating test potential, an indicator circuit and a network which will pass current from the alternating test potential source but effectively block direct or low frequency currents from the operating potential sources.

In one embodiment of the invention suitable for checking wiring-to-frame insulation of telephone equipment frames while the equipment is being operated or tested with normal operating potentials, such as low frequency (20 cycle per second) ringing current and direct current at various potentials being supplied thereto, the alternating test potential is derived from a 60 cycle per second source and the other currents are effectively blocked out of the indicator circuit by a suitable series capacitor. Whenever a foreign potential or a circuit ground is conductively connected to the electrically isolated frame (direct ground connections for the frame having been disconnected for the test) through a fault connection between the equipment wiring and the frame, 60 cycle current will flow in the normally non-conducting test circuit through the circuit ground or the ground for the foreign potential source to actuate a polarized relay in the detector or indicator circuit.

These and other features of the invention will be more readily understood from the following detailed description taken in conjunction with the accompanying drawing showing a schematic diagram of a preferred embodiment of a detecting system according to the invention.

Referring now to the drawing, telephone apparatus 3, mounted on an electrically isolated metal frame or support panel 2, is wired to various grounded D.C. and A.C. power sources 4, 5 and 6 as well as directly to a circuit ground 7 through a fuse 10. These sources may be mounted on the frame and may, for example, be of 24, 48 or 130 volts positive or negative and the A.C. source may be of 90 volts at 20 cycles per second which is the usual ringing frequency. Individual circuit fuses 8, 9 and 11 are provided in the grounding circuits for the sources 4, 5 and 6 respectively. Low voltage 60 cycle test potential is applied to the frame 2 from a grounded 12 to 18 volt winding of a bell ringing step down transformer 12, being connected thereto by a clip 14. The test potential supply circuit also includes a blocking condenser 15 of 0.25 microfarad having a high leak resistance 16 of 200,000 ohms shunted thereacross and a high impedance winding 17 of a transformer 18 whose low impedance winding controls the operation of a fault indicator control relay 20. The relay 20 is a sensitive, polarized D.C. relay having a spring biased, movable contact arm 21 and operates on about ¼ of a milliampere current through the relay winding. The relay is energized by the output of a full wave rectifier 22 when an alternating potential is induced in winding 19 of transformer 18.

Fault indicator lamps 23 and 24 are energized by closing contact arm 21 of relay 20 which supplies a ground connection through lamp 23 to battery 25 to complete the circuit for lamp 23, and which also completes an energizing circuit for a lock-up relay 26 which, when operated, closes its contact 27 to complete a circuit from ground at energizing source 28 through lamp 24 to battery 25. In operating relay 26 also opens contact 33 so that lamp 23 is extinguished when relay 20 releases but lamp 24 will remain energized until a release key 29 is operated to open the lock-up circuit for relay 26 which includes its contacts 30 and 31.

In the absence of any fault connections to the frame, the full potential developed across the low voltage winding of transformer 12 is applied to the test clip 14 connected to the frame 2 since the test potential supply circuit is electrically open there being no return to ground. When a foreign potential is applied to a frame 2 through a fault "X," the resistance of which is shown schematically as resistor 32 connected between clip 14 and the battery 4, an alternating current will flow from the test circuit ground through the series connected windings of transformers 12 and 18, condenser 15, clip 14, frame 2, the fault path resistance 32, and battery 4 to ground 7. Blocking condenser 15 prevents high D.C. or low frequency A.C. potentials on the frame 2 from damaging the transformer. Since any D.C. potential on the frame is blocked from the test circuit, the circuit has uniform sensitivity to all D.C. potentials on the frame. The induced alternating current in winding 19 of transformer 18 is rectified in rectifier 22 and operates relay 20. Operation of relay 20 energizes fault indicating lamp 23 and also operates lock-up relay 26 which in turn energizes fault indicating lamp 24.

When the foreign potential is cleared from the frame, relay 20 is released and extinguishes lamp 23. Lamp 24, however, remains energized since lock-up relay 26 is held operated until key 29 is operated. This lock-up circuit for lamp 24 therefore insures detection of momentary faults which may not be noticed by the operator.

The high impedance characteristic of winding 17 of ttransformer 18 makes the detector effective even for faults of high impedance, whether the path be resistive, capacitive or inductive. The sensitivity of the circuit is determined by the circuit components used and the sensitivity and spring bias of the polarized relay 20. In the present case, in which transformer 18 is an audio interstage transformer, winding 17 having an impedance of about 30,000 ohms, relay 20 is operable for any fault path having an impedance up to 15,000 ohms to ground. The range however may be extended somewhat by varying the spring bias on the relay. The leak resistance 16 is provided for condenser 15 to prevent the condenser from retaining a large charge which might injure the operator when handling the clip 14.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A system for detecting conductive paths from electrical apparatus to a frame on which it is mounted while normal operating potentials are applied to the apparatus, said system comprising a normally open-circuited, grounded test circuit having an alternating potential source connected in series with a winding of a transformer and the frame, an indicator inductively coupled to the transformer which is actuated by alternating current in the winding in the test circuit when the circuit is closed through a conductive path supplying a potential to the frame, and a condenser for blocking D.C. and low frequency potentials from the test circuit serially connected in the test circuit.

2. A system for detecting conductive paths from electrical apparatus to a frame on which it is mounted while normal operating potentials are applied to the apparatus, said system comprising a normally open-circuited, grounded test circuit having an alternating potential source connected in series with a winding of a transformer and the frame, an indicator inductively coupled to the transformer which is actuated by alternating current in the winding in the test circuit when the circuit is closed through a conductive path supplying a potential to the frame, a condenser for blocking D.C. and low frequency potentials from the test circuit serially connected in the test circuit and a shunting leak resistor for the condenser to prevent the retaining of a large electrical charge in the condenser.

3. A system for detecting conductive paths from electrical apparatus to a frame on which it is mounted while normal operating potentials are applied to the apparatus, said system comprising a normally open-circuited, grounded test circuit having a source of alternating potential connected in series with a winding of a transformer and the frame, a condenser serially connected in the test circuit for blocking D.C. and low frequency alternating potentials from the test circuit, an indicator circuit comprising a secondary winding for the transformer, a control relay energized by current in the transformer and fault indicating means operated when the relay is actuated for indicating electrical current flow in the test circuit when the circuit is closed through a conductive path supplying a potential to the frame.

4. A system according to claim 3 in which the relay is a polarized D.C. relay and a full wave rectifier is connected between the secondary winding and the winding of the relay.

5. A system for detecting conductive paths from electrical apparatus to a frame on which it is mounted while normal operating potentials are applied to the apparatus, said system comprising a normally open-circuited, grounded test circuit having a source of alternating potential connected in series with a winding of a transformer and the frame, an indicator circuit comprising a secondary winding for the transformer, a control relay energized by current in the transformer, and fault indicating means operated when the relay is actuated for indicating electrical current flow in the test circuit when the circuit is closed through a conductive path supplying a potential to the frame, said indicating means comprising first and second indicator devices, a second relay for energizing the second indicator having a normally open, lock-up circuit therefor and a switch serially connected in the lock-up circuit for opening said circuit, and contacts on the control relay for simultaneously energizing the first indicator and the second relay.

References Cited in the file of this patent
UNITED STATES PATENTS

| | | |
|---|---|---|
| 2,390,778 | Cook | Dec. 11, 1945 |
| 2,627,540 | Rich | Feb. 3, 1953 |
| 2,651,752 | Devot | Sept. 8, 1953 |
| 2,663,844 | Earle et al. | Dec. 29, 1953 |
| 2,690,477 | Friedmann et al. | Sept. 28, 1954 |
| 2,707,267 | Gavin | Apr. 26, 1955 |